US011227338B2

(12) United States Patent
Scudder et al.

(10) Patent No.: US 11,227,338 B2
(45) Date of Patent: *Jan. 18, 2022

(54) PROCESSING AND OPTIMIZING TRAVEL INSURANCE TRANSACTIONS

(71) Applicant: American International Group, Inc., New York, NY (US)

(72) Inventors: Ellison Scudder, New York, NY (US); John Selle, Cedar Grove, NJ (US); Robert Azuma, Parsippany, NJ (US); Jeff Schafer, Jersey City, NJ (US)

(73) Assignee: AMERICAN INTERNATIONAL GROUP, INC., New York, NY (US)

( * ) Notice: Subject to any disclaimer, the term of this patent is extended or adjusted under 35 U.S.C. 154(b) by 352 days.

This patent is subject to a terminal disclaimer.

(21) Appl. No.: 16/017,733

(22) Filed: Jun. 25, 2018

(65) Prior Publication Data
US 2018/0308176 A1 Oct. 25, 2018

Related U.S. Application Data (63) Continuation of application No. 14/068,617, filed on Oct. 31, 2013, now abandoned, which is a (Continued)

(51) Int. Cl.
*G06Q 40/08* (2012.01)
*G06Q 10/10* (2012.01)
(Continued)

(52) U.S. Cl.
CPC ............ *G06Q 40/08* (2013.01); *G06Q 10/10* (2013.01); *G06Q 30/0241* (2013.01); *G06Q 50/14* (2013.01)

(58) Field of Classification Search
None
See application file for complete search history.

(56) References Cited

U.S. PATENT DOCUMENTS 5,576,951 A * 11/1996 Lockwood ........... G06Q 10/025
235/381
7,124,101 B1 * 10/2006 Mikurak ............... G06Q 10/06
705/35
(Continued)

OTHER PUBLICATIONS

International Searching Authority, International Search Report and Written Opinion relative to cognate International Application No. PCT/US2011/051398 (dated Dec. 23, 2011).
(Continued)

*Primary Examiner* — Narayanswamy Subramanian
(74) *Attorney, Agent, or Firm* — Snell & Wilmer L.L.P.; Lisa M. Knight (57) ABSTRACT

A method and system for processing communications between travel service providers and travel insurers where travel service providers use different messaging formats. A travel service provider transmits itinerary data to a travel insurer in one messaging format. The travel insurer may then convert the itinerary data into a format compatible with the travel insurer's system and determine an optimal policy choice based on the itinerary data. The travel insurer may then transmit this choice to the travel service provider in the travel service provider's preferred messaging format, and the travel service provider offers the product to the consumer through the travel service provider's interface.

6 Claims, 3 Drawing Sheets

Related U.S. Application Data continuation of application No. 13/231,535, filed on Sep. 13, 2011, now Pat. No. 8,577,767.

(60) Provisional application No. 61/382,418, filed on Sep. 13, 2010.

(51) Int. Cl.
*G06Q 30/02* (2012.01)
*G06Q 50/14* (2012.01)

(56) References Cited

U.S. PATENT DOCUMENTS

| | | | |
|---|---|---|---|
| 7,310,674 B2 | 12/2007 | Mitsumori | |
| 8,577,767 B2* | 11/2013 | Scudder | G06Q 10/10 |
| | | | 705/35 |
| 8,744,937 B2* | 6/2014 | Seubert | G06Q 40/00 |
| | | | 705/35 |
| 2002/0194207 A1 | 12/2002 | Bartlett et al. | |
| 2003/0018661 A1 | 1/2003 | Darugar | |
| 2003/0058842 A1 | 3/2003 | Bud | |
| 2004/0059610 A1 | 3/2004 | Winterton et al. | |
| 2004/0186902 A1 | 9/2004 | Stewart | |
| 2004/0267555 A1 | 12/2004 | Dale | |
| 2008/0294469 A1 | 11/2008 | Caballero et al. | |
| 2009/0030885 A1 | 1/2009 | DePasquale et al. | |
| 2009/0307321 A1 | 12/2009 | Sawant | |
| 2010/0223079 A1 | 9/2010 | Roschelle et al. | |
| 2010/0250292 A1 | 9/2010 | Wurster | |
| 2010/0287008 A1 | 11/2010 | Roark | |
| 2011/0261049 A1* | 10/2011 | Cardno | G06Q 10/10 |
| | | | 345/419 |
| 2012/0066008 A1* | 3/2012 | Scudder | G06Q 40/08 |
| | | | 705/4 |
| 2015/0324904 A1* | 11/2015 | Starikova | G06Q 30/016 |
| | | | 705/35 |
| 2018/0204253 A1* | 7/2018 | Painter | G06F 40/205 |
| 2018/0308176 A1* | 10/2018 | Scudder | G06Q 10/10 |
| 2021/0082062 A1* | 3/2021 | Hurd | G06N 20/00 |

OTHER PUBLICATIONS

International Bureau of WIPO, International Preliminary Report on Patentability issued in cognate International Application No. PCT/US2011/051398 (dated Mar. 28, 2013).

USPTO; Non-Final Office Action dated May 9, 2014 in U.S. Appl. No. 14/068,617.

USPTO; Non-Final Office Action dated Nov. 24, 2014 in U.S. Appl. No. 14/068,617.

USPTO; Final Office Action dated May 6, 2015 in U.S. Appl. No. 14/068,617.

USPTO; Non-Final Office Action dated Dec. 31, 2012 in U.S. Appl. No. 13/231,535.

USPTO; Notice of Allowance dated Jul. 22, 2013 in U.S. Appl. No. 13/231,535.

* cited by examiner

PROCESSING AND OPTIMIZING TRAVEL INSURANCE TRANSACTIONS

CROSS-REFERENCE TO RELATED APPLICATIONS

This patent application is a continuation of copending U.S. patent application Ser. No. 14/068,617, filed on Oct. 31, 2013, and entitled, "Processing and Optimizing Travel Insurance Transactions," which is a continuation of U.S. patent application Ser. No. 13/231,535, filed on Sep. 13, 2011, and entitled, "Method And System For Processing And Optimizing Travel Insurance Transactions," which issued as U.S. Pat. No. 8,577,767 on Nov. 5, 2013, which in turn claims the benefit of U.S. Provisional Patent Application No. 61/382,418, filed on Sep. 13, 2010, and entitled, "Method and System for Processing Seller Partner-Transactions," which are incorporated in their entireties herein by this reference.

FIELD OF INVENTION

The present invention relates generally to data processing and relates more particularly to processing communications between travel service providers and travel insurers.

BACKGROUND OF THE INVENTION

Retail sellers often partner with other types of retail sellers to provide consumers with a convenient forum from which they can have multiple product needs met. For example, travel insurance companies often partner with travel service providers (airlines, hotels, on-line travel agencies, etc.) for the integration of travel insurance into the "booking path" of the travel purchase. When a consumer purchases an airline ticket on an airline's website, an offer is made to the consumer for travel insurance. If the offer is accepted, a policy is issued. In this example, the airline's booking system interacts with the travel insurer's system, typically via XML messaging, to quote and bind the insurance policy as part of a seamless consumer experience.

The travel insurer may require travel service providers (e.g., the airline) to undergo an extensive and time-consuming integration process whereby they "code to" the travel insurer's XML specification. Additionally, the travel service providers are required to develop the logic on their systems whereby they communicate to the travel insurer which product will be sold on a particular transaction to a particular consumer. The travel insurer may provide the business logic for these product choices, but the burden typically falls on the travel service provider to develop the technical logic to support it.

For example, an airline or other travel service provider's website must determine which product is appropriate for the consumer and then request a quote using the travel insurer's proprietary XML specification. Because the business logic is implemented on the travel service provider's website, the travel insurer simply responds by providing a quote to the travel service provider, rather than verifying the travel service provider's product choice or providing alternative or more optimal options. This arrangement between the travel service provider and the travel insurer limits the capability of the travel insurer to provide flexible and up-to-date product choices available to the consumers. This arrangement can also result in errors due to the lack of verification by the travel insurer.

It will be appreciated that the inventors have created the above body of information for the convenience of the reader. The foregoing is a discussion of problems discovered and/or appreciated by the inventors, and is not an attempt to review or catalog the prior art.

BRIEF SUMMARY OF THE INVENTION

The described invention allows for the processing of different data formats that contains the business data needed to sell a product without requiring a partner to code to a specific standard. A preferred embodiment of the invention has applicability in quoting and binding travel insurance. A travel service provider may send relevant itinerary data to the travel insurer utilizing the travel service provider's pre-existing or preferred format, and the travel insurer determines which product is appropriate for the itinerary and responds to the travel service provider in the travel service provider's pre-existing or preferred format. In contrast to conventional systems, travel service providers are not restricted to using a particular XML format specified by the travel insurers, so the travel service providers are free to use whichever data format is more convenient to them (including XML, HTML, or simple text delimited files). Furthermore, an optimal policy determination is performed at the travel insurer's system to allow the travel insurer to provide better and more up-to-date policy options based on the itinerary data, as well as allowing the travel insurer to verify that the correct policy option or options are being offered to the consumer based on the itinerary data.

In a general embodiment, a partner sends transaction data to a seller in the partner's preferred format, and if the partner's preferred format is incompatible with the seller's preferred format, the data needed is extracted and converted to the seller's preferred format by an XML processor. The particular conversion code for each partner's preferred format may be advantageously loaded into the XML processor's memory cache for increased speed and security.

The seller may then apply the seller's product selection logic to the transaction data to determine an optimal product or products based on the transaction data. Because the product selection logic is being implemented on the seller's system, the seller is able to formulate a variety of options suited specifically to a particular consumer's needs. The seller can verify that the product selected is appropriate for the consumer, the seller can provide alternative product choices, and the seller has flexibility in freely changing its product selection algorithms. Thus, the seller can account for additional consumer-specific variables and rapidly adapt to changing market conditions.

After determining an optimal product or products, the seller's system may utilize an XML processor or other appropriate processors to convert the optimal product or products data into the partner's preferred format, and the message may then be transmitted to the partner. The partner displays the product choice or choices on its website, and the consumer receives an optimal product offer or offers based on the seller's recommendations. The seller may additionally include advertisements or promotional material in combination with the product offer or offers displayed on the partner's website.

In a preferred embodiment described with further detail herein, the seller is a travel insurer and the partner is a travel service provider, and the travel insurer's product offerings are integrated into the interface that the travel service provider presents to consumers purchasing the travel service provider's products.

As will be appreciated by the teachings herein, the present invention allows partners to utilize whichever format for data storage and transmission that they prefer, as well as allowing sellers to offer optimized product choices and change product options with greatly reduced technical support from partners. Other objects and advantages of the invention will become apparent upon reading the following detailed description and upon reference to the drawings.

DETAILED DESCRIPTION OF THE INVENTION

While the invention is described below in the context of a preferred embodiment involving a travel insurer as a "seller" and a travel service provider as a "partner," it will be appreciated that the inventive principles disclosed with respect to the preferred embodiment are more broadly applicable to other seller-partner relationships.

Figure 1:
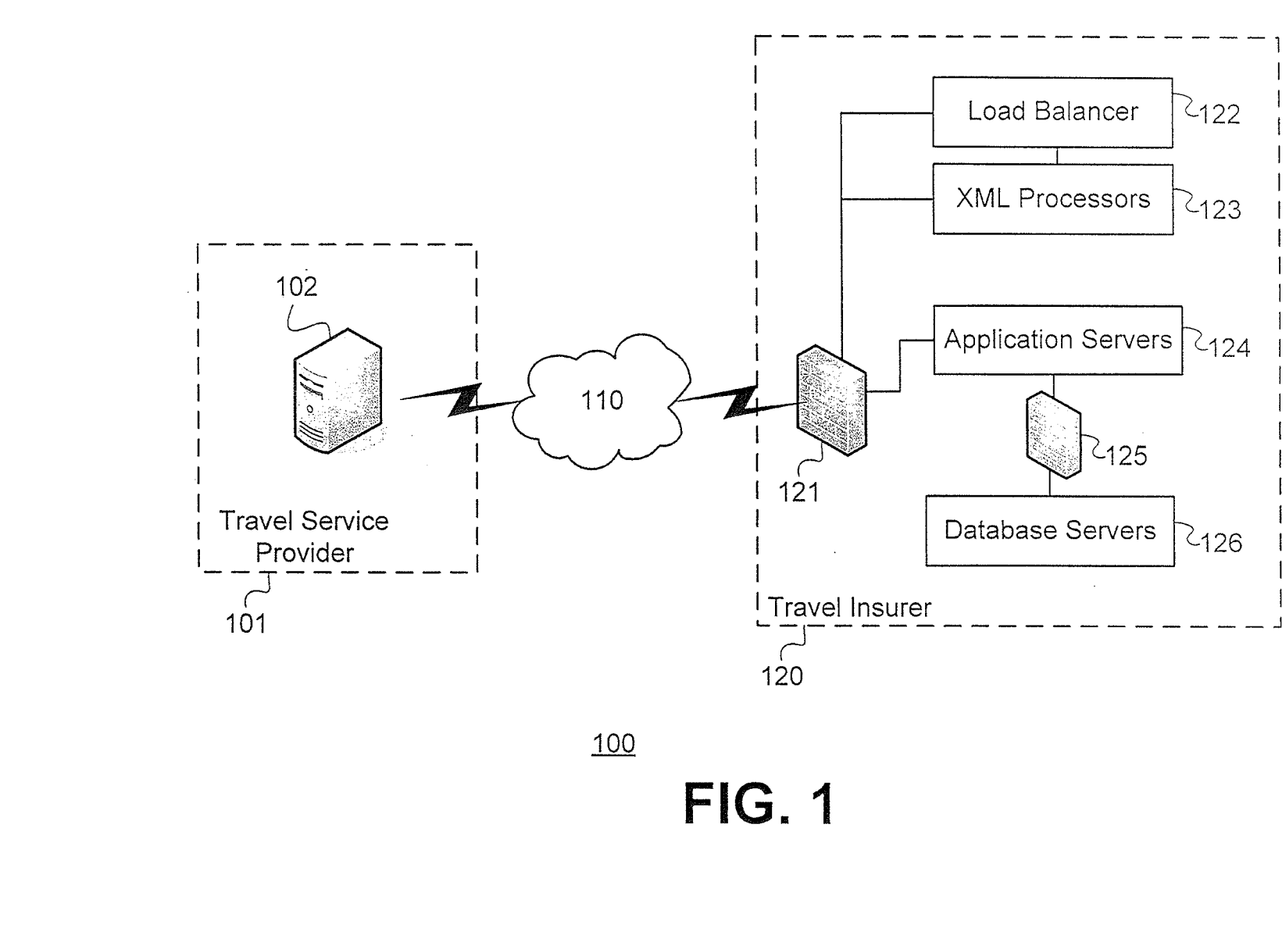
FIG. 1 is a diagram illustrating the components of a travel insurer's data processing system in one exemplary embodiment.

FIG. 1 provides an exemplary system architecture 100 of a travel insurer's system and its connection to a travel service provider's system. A computer or server 102 of the travel service provider's system is connected to a network 110 (e.g., the Internet). It will be appreciated that the travel service provider's system may be more complex and include more components (e.g. databases, application servers, firewalls, etc.), but for simplicity of illustration only a computer or server 102 is depicted.

The travel insurer's system 120 is also connected to the network 110 and protected by a firewall 121. Messages received through the network 110 are processed by a conventional load balancer 122 (for distributing workload corresponding to entities accessing the travel insurer's system) and one or more XML processors 123, which parse received messages to extract data and re-format the messages (to a format compatible with the travel insurer's proprietary rating and issuance engine residing on application servers 124) if needed. Preferably, a pool of multiple XML processors 123 may be used. In one embodiment, the XML processors may be DataPower XI50s manufactured by IBM, of Armonk, N.Y.

The travel insurer's system 120 further includes application servers 124, through which the travel insurer's proprietary rating and issuance engine may process message data to determine an appropriate policy. These application servers 124 may access data from database servers 126 within the travel insurer's system 120, and the connection between the application servers 124 and the database servers 126 may be protected by another firewall 125.

It will be appreciated the travel insurer's system 120 need not be implemented in the manner depicted and that one of ordinary skill in the art would be able to vary the system design and still practice the inventive principles described herein. For example, various components of the travel insurer's system 120 may be interconnected without firewalls, or the travel insurer's system may additionally include a web server (depending on how the travel service provider's user interface is configured). It will further be appreciated that, in other embodiments, the various components described herein (e.g. the load balancers, XML processors, and application servers) may be implemented by other types of hardware, such as a general computing unit with appropriate programming.

It will further be appreciated by those of skill in the art that the execution of the various machine-implemented processes and steps described herein may occur via the computerized execution of computer-executable instructions stored on a tangible computer-readable medium, e.g., RAM, ROM, PROM, volatile, nonvolatile, or other electronic memory mechanism. Thus, for example, the operations performed by the travel insurer's proprietary rating and issuance engine may be carried out according to instructions or applications stored at the application servers 124.

Figure 2:
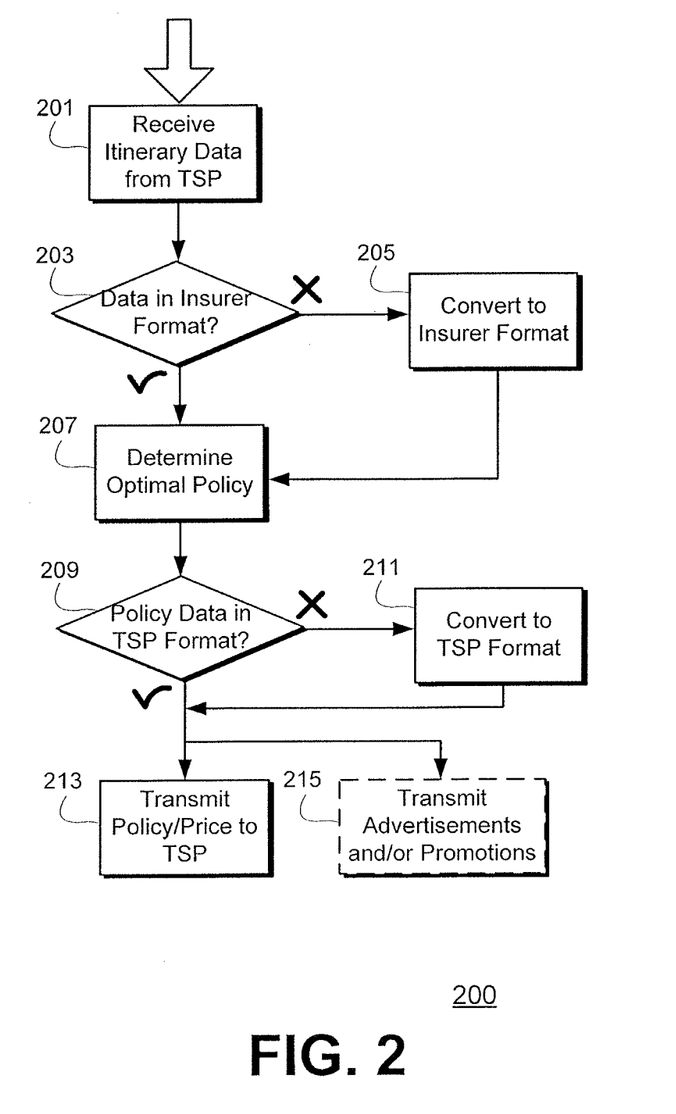
FIG. 2 is a flowchart illustrating the processing of itinerary data received from a travel service provider at a travel insurer system in one exemplary embodiment.

Given the exemplary system architecture depicted by FIG. 1, a general process 200 for receiving and processing itinerary data from a travel service provider (TSP) at the travel insurer's system 120 is depicted by FIG. 2. In one embodiment, the travel insurer's system 120 receives itinerary data corresponding to one or more consumers from a travel service provider's system 101, and the itinerary data is formatted using the travel service provider's preferred format, which may be, for example, XML, HTML, or simple delimited text (201). A component of the travel insurer's system 120, such as the load balancer 122, XML processors 123, or application servers 124, then determines whether the itinerary data is in a format that is compatible with the travel insurer's rating and issuance engine (203). If it is not compatible, the XML processors 123 convert the received itinerary data into a format that is compatible with the travel insurer's rating and issuance engine (205), and the rating and issuance engine, implemented on the applications servers 125 and accessing information from database servers 127, determines one or more optimal policy options based on the itinerary data (207). If the received itinerary data is already compatible with the travel insurer's rating and issuance engine, no conversion is necessary.

If the optimal policy data determined by the travel insurer's rating and issuance engine is not in a format compatible with the travel service provider's system 101 (209), the optimal policy data is converted into a format that is compatible with the travel service provider's system 101 (211). The reformatted optimal policy data is then transmitted to the travel service provider's system 101 for presentation to a consumer using the travel service provider's system 101 (213). If the optimal policy data determined by the travel insurer's rating and issuance engine is already in a format compatible with the travel service provider's system 101 (209), no conversion is necessary before transmission to the travel service provider's system 101 (213). In a preferred embodiment, the offer to purchase travel insurance is presented to the consumer through the travel service provider's interface in order to integrate the purchase of travel insurance with the consumer's purchase of the travel services provided by the travel service provider.

It will be appreciated that the determination of one or more optimal policy options by the travel insurer's rating and issuance engine may be based on parameters including, but not limited to, the itinerary type (one way or round trip), the type of consumer (individual or multiple travelers), the trip duration, the category of destination, the trip cost (insured or policy level), the consumer's frequent flier status, and the type of package (air only or package deal). To perform the determination of the one or more optimal policy options, the rating and issuance engine on the application servers may query the database for underwriting data and risk factor data such as itinerary-specific (e.g., based on date, length of trip, region(s) being visited, etc.) costs relating to lost luggage, medical expenses, and/or trip cancellations. The rating and issuance engine then applies one or more policy calculation algorithms to the itinerary data and risk factor data to generate optimal policy data, which is transmitted to the travel service provider and may include parameters such as plan choice(s), price(s) and coverage(s). It will further be appreciated that more than one optimal policy option may be included in the optimal policy data and transmitted to the travel service provider's system 101 for presentation to the consumer. For example, it may be advantageous to provide the consumer with multiple travel insurance options based on their itinerary data in the event that one or the other is more appealing to the consumer (e.g., a less expensive plan including only cancellation coverage and a more expensive plan including coverage for both medical expenses and cancellation). In addition, the system and method of an embodiment of the invention may use a consumer-indicated preference or factor to be optimized to determine an appropriate policy to be quoted (e.g., the consumer may indicate that he or she wants comprehensive medical coverage but only minimal cancellation and lost luggage coverage).

In a further embodiment, advertisements and/or promotions may be transmitted to the travel service provider's system 101 for presentation to the consumer in addition to the one or more optimal policy options and/or prices (215). Such advertisements and/or promotions may be specifically targeted to the consumer based on the itinerary data. For example, these advertisements may stress the need for insurance based on the consumer's travel plans ("Protect yourselves from travel delays caused by the holiday rush!") or promote special discounted rates for specific types of consumers ("Get an additional 10% Off! Exclusively for our Gold Members"). To accomplish this variation, application servers 124 work in conjunction with database servers 126 to identify potential insurable risks, special circumstances, or other considerations. For example, if the itinerary data indicates that the consumer is going to travel to a hurricane-prone area during hurricane-prone season, the ratings and issuance engine, working with the database servers 126, may identify that the risk for cancellation and/or medical expenses is especially high and automatically generate corresponding advertisements and optimal policy options taking those considerations into account.

Figure 3:
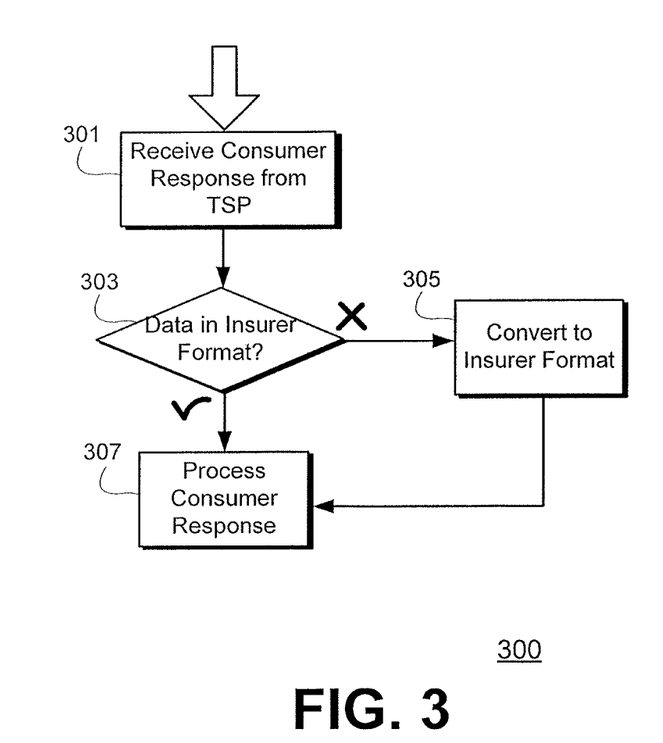
FIG. 3 is a flowchart illustrating the processing a customer response received from a travel service provider at a travel insurer system in one exemplary embodiment.

Turning now to FIG. 3, in a preferred embodiment, a consumer may respond to the travel insurer's offer to sell a policy through the travel service provider's interface (301). This response may indicate whether the consumer wishes to purchase the policy or not, and, in the event that the consumer wishes to purchase the policy, may further provide payment information (such as desired payment method and any necessary details). It will be appreciated that a lack of response for a predetermined length of time (e.g. a timeout) may also indicate to the travel insurer system 120 that the consumer does not wish to purchase the policy. It will further be appreciated that other methods of responding to the offer may be utilized as well, such as, for example, providing a link to the consumer to access a travel insurer's web interface directly.

The travel insurer's system 120 may determine whether data corresponding to a consumer response is in a format compatible with the travel insurer's system 120 (303), and if it is not, may use one or more XML processors 123 to convert the consumer response data into a format compatible with the travel insurer's system 120 (305). The application servers 124 may then process the consumer response data (307), which may include processing the payment information (e.g. charging a credit card using credit card information provided by the consumer) and storing transaction information at the database servers 126 (e.g. storing transaction details or logging successful and unsuccessful policy offers or promotion offers). If the consumer response data was already in a format compatible with the travel insurer's system 120 to begin with, no conversion may be necessary.

It will be appreciated that further communications may take place between the travel insurer system 120 and the travel service provider system 101. For example, the travel insurer system 120 may transmit a transaction confirmation (e.g. including a policy number, payment details, a message stating that the transaction was completed, etc.) back to the travel service provider system 101, performing format conversion if necessary according to the procedures described above.

In order to transform a message from a travel service provider's preferred format that is not compatible with the travel insurer's proprietary rating and issuance engine into a format that is compatible with the travel insurer's proprietary rating and issuance engine, the travel insurer may first verify that the travel service provider is capturing the data that the travel insurer desires from the consumer. This may be performed by, for example, giving the travel service provider a checklist as depicted in Table 1 below to ensure that data used by the rating and issuance engine is being collected. It will be appreciated that Table 1 is merely exemplary and that more or less (or different) data fields may be used.

TABLE 1

Data Collection Checklist

CUSTOMER INFORMATION

Customer Last Name
Customer First Name
Customer Address
Phone number
email
Country of Residence
Date of Birth
Age
Passenger Type (e.g., Infant/Child/Adult/Senior)
Customer Status (e.g., FF level - gold, platinum, etc.)
Number of insureds/passengers on trip
Customer ID (e.g., Passport number)

TRIP INFORMATION

One Way/RoundTrip Indicator
Origin (IATA airport code)
Trip Begin Date
Trip End Date
Destination (IATA airport code) - (must be Furthest Destination)
PNR/Record Locator (e.g., ABC123)
Trip Cost by Individual
Payment Details (Cash, Credit Card, Miles . . . etc) If yes, please provide details
Class of Service (First/Business/Coach)
Fare Basis Code (e.g., YM, K14NYC)
Booking Class of Service (e.g., F, Y, K, Q, K, N, X)
Carrier/Provider Name (e.g., United, American, NCL, Marriott)
Airline Only versus Package Indicator
Total Trip Cost If not all the data desired by the travel insurer is being collected, the travel service provider may be asked to adjust their interface so as to collect that data, or the travel insurer may modify its rating and issuance engine to work with the data presently collected for that travel service provider in particular (or some combination thereof).

Assuming the travel service provider's data is collected in a messaging format that is not compatible with the travel insurer's rating and issuance engine, the travel insurer may then map the data in the travel service provider's format to corresponding data fields in the format compatible with the rating and issuance engine (e.g. identifying where a customer's name is, where a customer address is, and where trip information is in the travel service provider's format). For example, in one embodiment, assume that the travel service provider uses an XML message format (not compatible with the travel insurer's rating and issuance engine) and that a sample data record corresponding to a customer's itinerary is provided by Table 2 below.

TABLE 2

Sample XML Message

```
<?xml version="1.0"?>
<flight>
<customer_info>
    <first_name>John</first_name>
    <last_name>Doe</last_name>
    <address>123 123rd Street, Los Angeles, CA 12345</address>
    <phone>123-456-7890</phone>
    <email>john_doe@hotmail.com</email>
    <country>USA</country>
    <date_of_birth>01.01.1978</date_of_birth>
    <age>32</age>
    <type>Adult</type>
    <status>Platinum</status>
    <number_insured>1</number_insured>
    <passport>123456789</passport>
</customer_info>
<trip_data>
    <provider>XYZ Airlines</provider>
    <round_trip>Yes</round_trip>
    <origin>SYD</origin>
    <departure_date>08.26.2010</departure_date>
    <return_date>09.05.2010</return_date>
    <destination>LAX</destination>
    <flight_no>815</flight_no>
    <payment>Cash</payment>
    <fare_basis>YM</fare_basis>
    <booking_class>F</booking_class>
    <package>Yes</package>
</trip_data>
</flight>
```

A mapping code may be created using commercially available XML processing tools such as the Altova Map-Force data mapping tool and the Altova XMLSpy XML editor (developed by Altova of Beverly, Mass.) and may be implemented in the memory cache of the XML processor. Using eXtensible Stylesheet Language Transformations (XSLT), the travel service provider's message containing the desired consumer data in the travel service provider's preferred messaging format is manipulated to generate a new message in a format compatible with the travel insurer's rating and issuance engine. It will be appreciated that a different mapping may be used for each unique data messaging format used by a plurality of providers. One example illustrating an excerpt of several lines of mapping code used to transform the travel service provider's preferred XML format to a format compatible with the travel insurer's rating and issuance engine is given by Table 3 below.

TABLE 3

Sample Mapping Code

```
<?xml version="1.0" encoding="UTF-8"?>
<!-- This file was generated by Altova MapForce 2009sp1
Refer to the Altova MapForce Documentation for further details.
http://www.altova.com/mapforce -->
<xsl:stylesheet version="1.0" xmlns:xsl="http://www.w3.org/1999/XSL/Transform"
xmlns:xsi="http://www.w3.org/2001/XMLSchema-instance"
xmlns:xs="http://www.w3.org/2001/XMLSchema"
exclude-result-prefixes="xs xsi xsl">
  <xsl:output method="xml" encoding="UTF-8" indent="yes"/>
  <xsl:template match="/">
    <TINS_XML_DATA>
      <xsl:attribute name="xsi:noNamespaceSchemaLocation">
        <xsl:value-of
select="'C:/Datapower/DA8DB2~1/StandardOffering/WaatsLite/Group1Input.xsd'"/>
      </xsl:attribute>
      <xsl:variable name="var1_instance" select="."/>
      <Segment>
        <TransactionType>
          <xsl:copy-of
select="$var1_instance/TravelGuardInsuranceRQ/Transaction/TransactionCode"/>
        </TransactionType>
        <TransactionId>
          <xsl:copy-of
select="$var1_instance/TravelGuardInsuranceRQ/Transaction/TransactionCode"/>
        </TransactionType>
```

The message generated by the XML processor in the format that is compatible with the travel insurer's rating and issuance engine will then be processed by the rating and issuance engine. An exemplary set of data parameters that may be used by a rating and issuance engine in one embodiment is given by Table 4 below.

TABLE 4

Sample Data Parameters Used by Rating and Issuance Engine

| Data Parameters | Sample Values |
| --- | --- |
| GDS_CD | AAA |
| ORIGIN_IATA_CNTRY_CD | 41 |
| ORIGIN_IATA_AIRPORT_CD | ALL |
| FREQUENT_FLYER_STATUS | NONE |
| DEST_CONTINENT_CD | AS |
| DEST_IATA_CNTRY_CD | 41 |
| DEST_IATA_AIRPORT_CD | ALL |
| TRIP_TYPE | ALL |
| ISO_CURRENCY_CD | ALL |
| WAATS_IATA_AGENCY_CD | 99999999 |
| WAATS_AGENCY_PCC_CD | 99999 |
| WAATS_PRODUCT_CD | 20971 |
| WAATS_PLAN_CD | ONE |
| WAATS_BENEFIT_CD | 0 |
| RECORD_EFF_DT | 6/14/2010 11:05:32 AM |
| RECORD_EXP_DT | 6/14/2030 11:05:32 AM |
| SOURCE_SYSTEM_ID | WT |
| USERID_CD | WAATS |
| TIMESTAMP | 9/2/2010 10:33:15 AM |

Having received an XML message corresponding to itinerary data in a format compatible with the rating and issuance engine containing the data parameters used by the rating and issuance engine, the rating and issuance engine processes the data and outputs a message corresponding to an optimal policy or policies based on the itinerary data. An example of the policy data output by the rating and issuance engine in an XML format compatible with the rating and issuance engine is given in Table 5 below.

TABLE 5

Sample Policy Output

<TINS_XML_DATA><Header><ErrorCode>0</ErrorCode><ErrorMessage>OK</ErrorMessage><Version>1.0</Version><SourceId>AUS</SourceId><MessageId>6AUSq3caYz8DBnw0nS2O9Em735K</MessageId></Header><Segment><IgnoreFg></IgnoreFg><ErrorCode>0</ErrorCode><ErrorMessage></ErrorMessage><TransactionType>NSell</TransactionType><TransactionId></TransactionId><PolicyIn><GDSCode>AUS</GDSCode><AgencyPCC>CallCentre</AgencyPCC><AgencyCode>60000089</AgencyCode><IATACntryCd>6</IATACntryCd><TransactionType>NSell</TransactionType><GDSProductCode>020960</GDSProductCode><InceptionDate>06/03/2010 12:00:00 AM</InceptionDate><ExpirationDate>06/10/2010 11:59:00 PM</ExpirationDate><PaymentType>0</PaymentType><TotalNumberOfInsureds>1</TotalNumberOfInsureds><Address></Address><PolicyType>0</PolicyType><GeneralPurpose2>WebSiteUser</GeneralPurpose2><TransactionApplDate>10/27/2009 01:33:43 PM</TransactionApplDate><InsuranceType>IND</InsuranceType><TransactionEffDate>06/03/2010 12:00:00 AM</TransactionEffDate><TransactionExpDate>06/10/2010 11:59:00 PM</TransactionExpDate>

Subsequently, as described above, this policy output may be converted back to a format preferred by the travel service provider if necessary, and further communications between the travel service provider and travel insurer may take place based on the user's response to the travel insurance offer.

Thus, it will be appreciated that a new and useful method and system for sellers to provide flexible product options to consumers integrated into partners' sites while requiring minimal technical integration effort by the partners has been invented. However, it will also be appreciated that the disclosed embodiments are merely examples, and that the described principles are more widely applicable. All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:

1. A method for processing communications between a travel insurer and a travel service provider, comprising:
   providing, by a travel insurer computing system, remote access over a network to a data processor of a travel service provider computing system;
   receiving, over the network from the travel service provider computing system at the data processor of the travel insurer computing system, itinerary data in a first messaging format corresponding to a consumer travel itinerary, the itinerary data including destination information, cost information, and travel service provider information, the first messaging format being compatible with the travel service provider computing system;
   storing, in a database server of the travel insurer computing system, the itinerary data in the first messaging format;
   creating, by the data processor using a data mapping tool and editor, a mapping code specifically designed for the first messaging format;
   storing, in memory cache of the database server of the travel insurer computing system, the mapping code for increased speed and security;
   mapping, at the data processor and using the mapping code, the itinerary data in the first messaging format to data fields corresponding to a second messaging format, the second messaging format being different from the first messaging format,
   wherein the second messaging format is compatible with a rating and issuance engine of the travel insurer computing system, and wherein the mapping code designed specifically for the first messaging format is one of a plurality of different mapping codes designed specifically for a corresponding plurality of messaging formats each being different from the second messaging format, and
   wherein the mapping includes the data processor selecting the mapping code from the plurality of different mapping codes based upon the first messaging format;
   converting, at the data processor, the itinerary data in the first messaging format to itinerary data in the second messaging format, based on the mapping;

transmitting, from the data processor, the itinerary data in the second messaging format to a product selector engine of the travel insurer computing system, the first messaging format being incompatible with the product selector engine, and the second messaging format being compatible with the product selector engine;

determining, by the product selector engine, a product based on the itinerary data in the second messaging format, the product including a product option selected from a plurality of different product options based upon the itinerary data; and transmitting, by the travel insurer computing system to the travel service provider computing system, product data in the first messaging format corresponding to the product for presentation by the travel service provider computing system, the product data including the product option.

2. The method according to claim 1, wherein the first messaging format comprises one of XML, HTML, and delimited text.

3. The method according to claim 1, wherein the data processor is an XML processing unit.

4. The method according to claim 1, further comprising:
receiving, over the network from the travel service provider computing system at the data processor, a customer response including payment information corresponding to the product transmitted to the travel service provider computing system; and
converting, at the data processor, the customer response including payment information into the second messaging format.

5. The method according to claim 1, wherein the product selector engine is programmed with product selection logic through which the travel insurance computing system determines the product, the method further comprising:
modifying the product selection logic without modifying the travel service provider computing system.

6. The method according to claim 1, further comprising:
determining, by the product selector engine, an advertisement based on the itinerary data in the second messaging format, the advertisement including additional product;
transmitting, by the travel insurer computing system to the travel service provider computing system, the advertisement for presentation by the travel service provider computing system.

* * * * *